United States Patent [19]

Tolson

[11] Patent Number: 5,684,275
[45] Date of Patent: Nov. 4, 1997

[54] COMPUTER CONTROLLED WEIGHING AND LABELLING APPARATUS

[75] Inventor: Sidney S. Tolson, Scotland Neck, N.C.

[73] Assignee: Ossid Corporation, Rocky Mount, N.C.

[21] Appl. No.: 373,043

[22] Filed: Jan. 17, 1995

[51] Int. Cl.$^6$ .......... G01G 13/02; G01G 19/00; G01G 13/04
[52] U.S. Cl. .......... 177/119; 177/121; 177/145
[58] Field of Search .......... 177/5, 119, 120, 177/121, 145; 198/575, 626.5, 836.3

[56] References Cited

U.S. PATENT DOCUMENTS

| | | | |
|---|---|---|---|
| 3,196,964 | 7/1965 | Allen | 177/3 |
| 3,540,971 | 11/1970 | Johanski, Jr. | 156/566 |
| 3,650,773 | 3/1972 | Bush et al. | 99/171 R |
| 3,878,909 | 4/1975 | Treiber | 177/145 |
| 4,049,068 | 9/1977 | Kavanagh et al. | 177/145 X |
| 4,101,366 | 7/1978 | Teraoka et al. | 156/378 |
| 4,229,794 | 10/1980 | Foster | 364/466 |
| 4,276,112 | 6/1981 | French et al. | 156/360 |
| 4,415,048 | 11/1983 | Teraoka | 177/5 |
| 4,544,929 | 10/1985 | Lemelson | 346/9 |
| 4,548,024 | 10/1985 | Fine | 53/502 |
| 4,880,104 | 11/1989 | Evans et al. | 198/836.3 |
| 4,921,092 | 5/1990 | Crawford et al. | 198/575 |
| 5,086,855 | 2/1992 | Tolson | 177/5 |
| 5,326,938 | 7/1994 | Tolson | 177/5 |

Primary Examiner—Michael L. Gellner
Assistant Examiner—Randy W. Gibson
Attorney, Agent, or Firm—Olive & Olive, P.A.

[57] ABSTRACT

The present invention provides a conveyorized system for weighing and labeling products in packages and having multiple conveyor sections each of which is driven by an individual variable speed motor. A computer is supplied and connected to each of the variable speed motors. The computer contains data relating speed of operating each motor for a particular package style in the computer memory. An operator inputs a package code to the computer, which locates the package information stored in memory and signals the variable speed motors as to the desired speed for each conveyor. Similar information is maintained in the computer memory for each package as to dimensions, such that the computer signal output includes commands to several servo motors which are connected to adjust spacing between vertical control belts to accommodate the package and the positioning of a label applicator to suit. A further control involves a pair of sensors placed near the exit of the system to detect a blockage of package flow and, through computer programmed analysis, command an input conveyor to adjust operating speed accordingly.

2 Claims, 5 Drawing Sheets

COMPUTER CONTROLLED WEIGHING AND LABELLING APPARATUS

FIELD OF THE INVENTION

This invention relates to automatic weighing and labeling apparatus, and more particularly to such apparatus for use within a conveyorized production environment.

BACKGROUND OF THE INVENTION

Many types of packaged products require a label which indicates the weight and price of the product contained within the package, which weight and price is best determined after packing. Examples of such products include fresh or processed meat and produce. The present invention is particularly adapted to the weighing and labeling of packages of poultry items, although the principles of the invention have wider application.

When poultry or the like is packaged in a factory conveyorized production environment, as opposed to a supermarket or food shop, it is necessary to process a large number of packages per hour. A typical rate for producing packed, weighed and labelled poultry packages in a packaging line can be as high as 3000 per hour. Thus, economy and speed of operation, without sacrifice of weighing accuracy or label appearance and placement, is required. Produce and meat product packages may vary substantially both in the size of the package and in the form of the packaged product. Thus, machine versatility and quick changeover time are required. The conveyorized weighing and labeling apparatus of the present invention is adapted to operate at a high processing speed in a line incorporating other manual and automated operations, and it is recognized that a system component which is situated downstream may occasionally stop or slow down. Thus, it may become necessary to identify such a production flow problem and adjust the operating speed of the invention system accordingly.

U.S. Pat. No. 5,326,938, for WEIGHING/LABELING APPARATUS INCORPORATING IMPROVED CONVEYOR AND METHOD, to the present inventor, incorporated herein by reference, describes and claims an apparatus for weighing and labeling packages over which the present invention comprises an improvement.

It is therefore an object of this invention to provide a conveyorized weighing and labeling system which can weigh and label packages at a high rate of production.

An additional object of this invention is to provide a production system which can accommodate packages of a varying size with a minimum of changeover time.

A further object of this invention is to provide a production system which can sense a production flow change at one station and automatically adjust conditions at other stations to accommodate to such change.

Other objects and advantages will be more fully apparent from the following disclosure and appended claims.

SUMMARY OF THE INVENTION

The invention disclosed herein essentially comprises a conveyorized, automated weighing and labeling system and represents an improvement upon the weighing and labeling apparatus of U.S. Pat. No. 5,326,938. A driven supply conveyor transports packaged products to the entry conveyor of the weighing and labeling apparatus of the invention. The packaged and labelled product after being weighed and labeled is transported outward to a discharge conveyor. The discharge conveyor transports the product packages to a carton filling station.

The production system includes a programmed computer able to generate signals for adjusting conveyor speeds, vertical side belt positions, label applicator position and scale tare weight in response to the input of a product identification code. A further function of the computer is that of sensing and responding to a product flow slow-down or stoppage downstream of the weighing and labeling apparatus.

While it has heretofore been known to enter a product identification code in a computer and remotely adjust the label applicator position accordingly, it has not been heretofore known, so far as applicant is aware, to be able to simultaneously adjust not only the label applicator position but also the various conveyor speeds and side belt positions according to the same product identification code.

Various remotely controllable drive motors and servo motors are utilized to facilitate adjustment of the invention system components to the particular size product.

DETAILED DESCRIPTION OF THE INVENTION

The conveyorized weighing and labeling system of the invention is adapted to process packaged products which may vary in both size and weight. A typical such product is the film-wrapped package P illustrated in FIG. 1 comprising a tray filled with poultry parts. The invention system hereafter described utilizes a computer to remotely adjust all of those system components which require adjustment dependent on the size and form of the product and thereafter the product flows through the system during which the system determines the net weight of each package P, transmits the weight information to a label printing device, prints an appropriate label and applies the printed label to the package to which the weight pertains. An exemplary label L is shown in a common position on the upper surface of package P.

Figure 1:
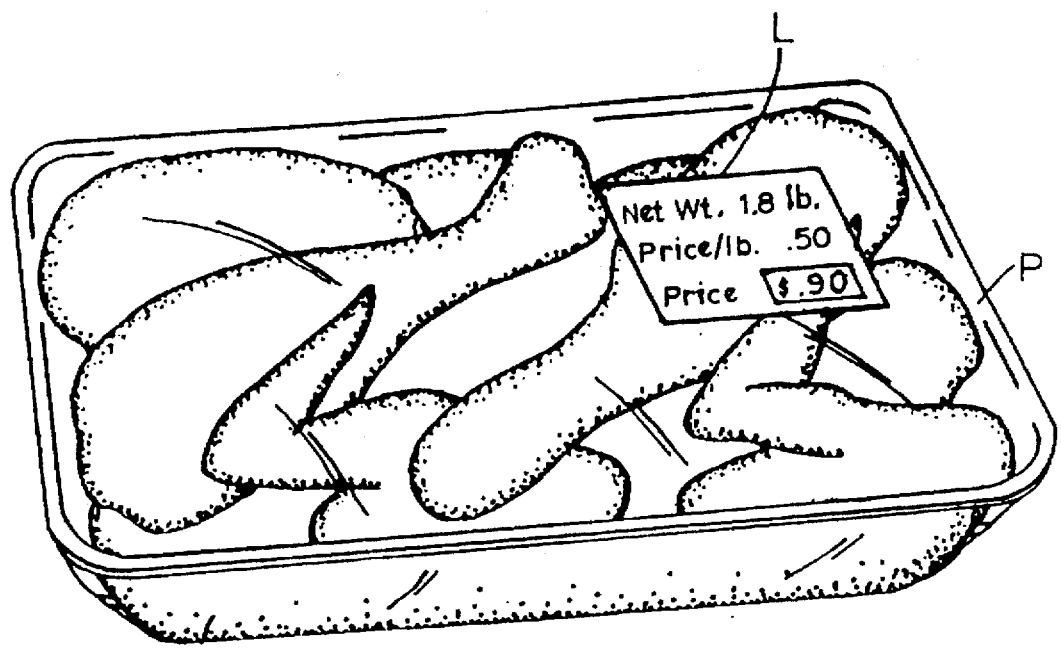
FIG. 1 is a perspective view of a film-wrapped poultry-filled package tray with an identifying label applied to an outer upper surface thereof.
Figure 2:
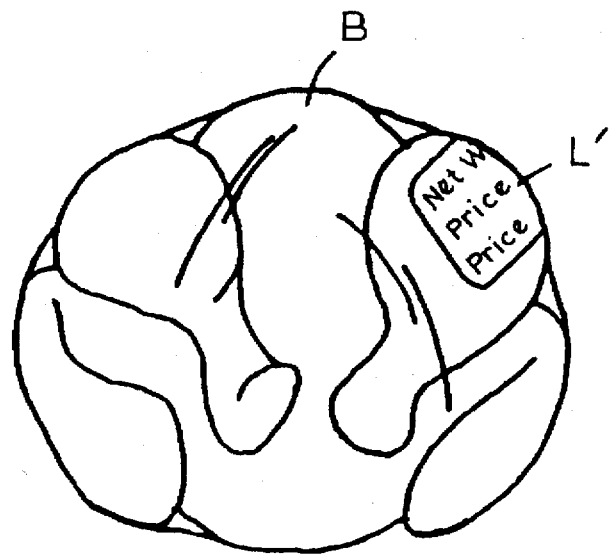
FIG. 2 is an end elevation view of a film-wrapped whole fowl packaged and ready to be weighed and labelled.

While much of the poultry processed is handled as poultry parts, as shown in FIG. 1, some poultry is packaged and sold as a whole bird B, as shown in a plastic bag package in FIG. 2 with a label L' applied, as is generally done. It will be readily appreciated that the task of positioning and adhering of label L' to whole bird package B is substantially different than that required for positioning and adhering label L to the poultry parts package P of FIG. 1.

Figure 3:
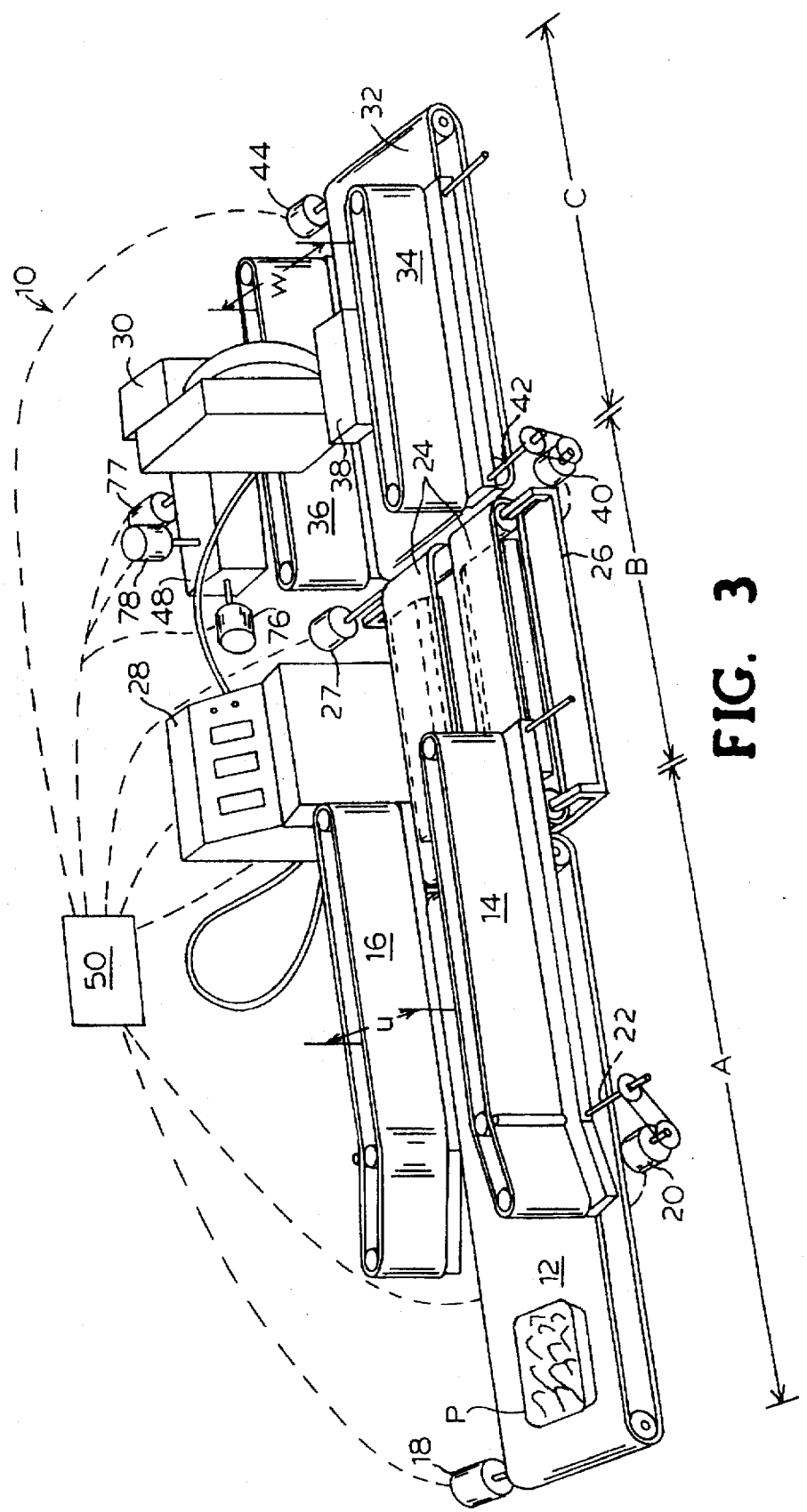
FIG. 3 is a perspective and somewhat schematic view of the central portion of the conveyorized weighing and labeling system of the invention incorporating some of the apparatus described in U.S. Pat. No. 5,326,938 and modified according to the present invention.

The major operative and central section of the system of the invention is shown in FIG. 3 as weighing and labeling apparatus 10 and which incorporates certain components of the apparatus of the '938 patent. As described in the '938 patent, entry section A has a horizontal belt 12 and a pair of opposed, laterally adjustable vertical control belts 14 and 16, each having an outwardly angled entrance portion to align and position the product to be processed. Horizontal belt 12 and vertical belts 14 and 16 are driven synchronously according to the invention by a remotely controllable, variable speed drive motor 18 with a drive interconnection, not shown. The speed of drive motor 18 is set by entry of the product identification code in computer 50 as later described. To further accommodate and properly control different size packages P to be processed, vertical control belts 14 and 16 are remotely adjustable according to the present invention so as to vary space U by means of a servo motor 20 connected to a position adjusting screw system 22 only generally illustrated. Once the product identification code is entered in computer 50 as later described, space U is adjusted to correspond with such code. With continuing reference to FIG. 3, package P next passes to weighing section B and onto split horizontal belt 24, mounted on a weighing platform 26 which sends a weight signal to weighing device 28 as more fully described in the '938 patent. Horizontal belt 24 is driven according to the present invention by a second remotely controllable variable speed drive motor 27 whose speed is set by entry of the product identification code in computer 50. Weighing device 28 computes a net weight which is transmitted to labeling device 30. As product P moves onto horizontal belt 32 of labeling section C, a label is printed in labeller 30. Horizontal belt 32 and vertical control belts 34 and 36 are driven synchronously through an interconnected drive, not shown, by a remotely controllable variable speed drive motor 44. Vertical control belts 34 and 36 are also remotely adjustable for spacing W by means of an adjusting screw system 42 and the remotely controllable servo motor 40. The speed of drive motor 44 and the spacing W are established when the product identification code is entered in computer 50 as later referred to.

In comparison to the weighing and labeling apparatus disclosed and claimed in U.S. Pat. No. 5,326,938, the weighing and labeling apparatus of the system of the invention differs by having the conveyor belt in each of sections A, B and C driven by an individual remotely controllable variable speed motor and by having remotely controllable servo motor actuated adjustment of the respective spaces U and W between the vertical belts. The speed of such motors and the setting of such spaces is set according to the product identification code entered in computer 50. Label device 30 is mounted on a remotely controllable, three dimensionally adjustable, servo motor actuated adjuster 48, allowing the label device 30, and more particularly its label applicator head 38, to be positioned in the manner of the '938 patent apparatus so as to be able to place label L in the position desired for each type of package processed according to its identification code as entered in computer 50. What is achieved by the present invention is the coordination of such label placement with those conveyor speeds and belt spacings which also relate to the product identification code.

Figure 4:
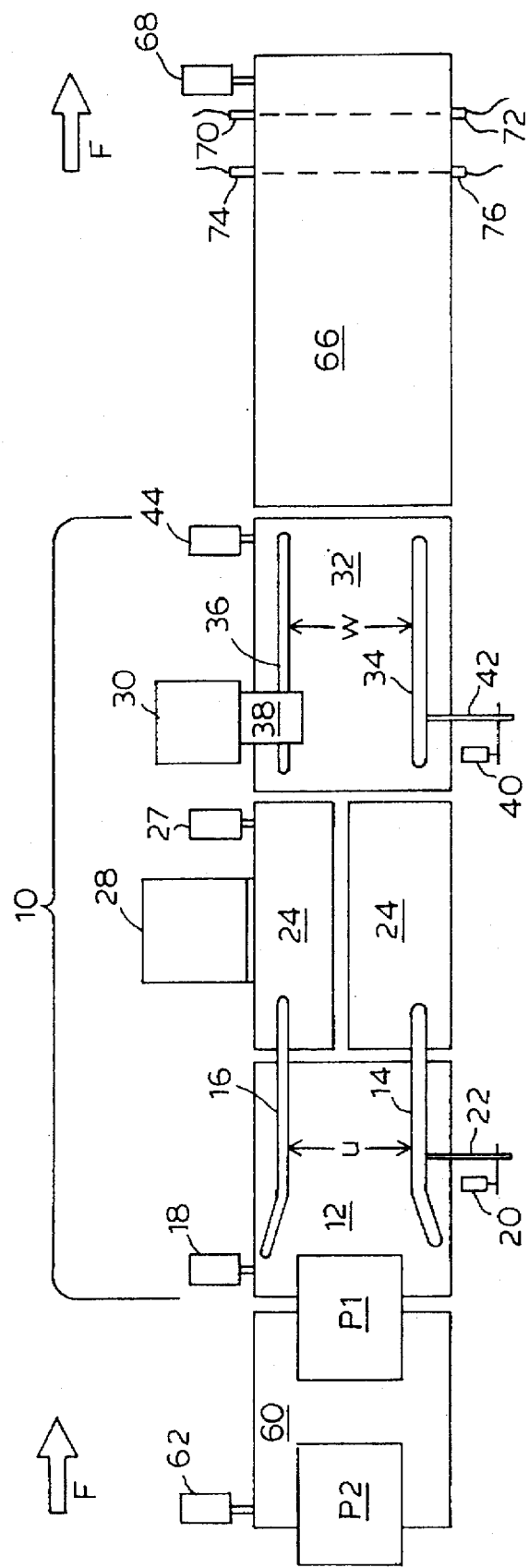
FIG. 4 is a top plan view of the overall conveyorized weighing and labeling system of the invention including the infeed and discharge conveyors.
Figure 6:
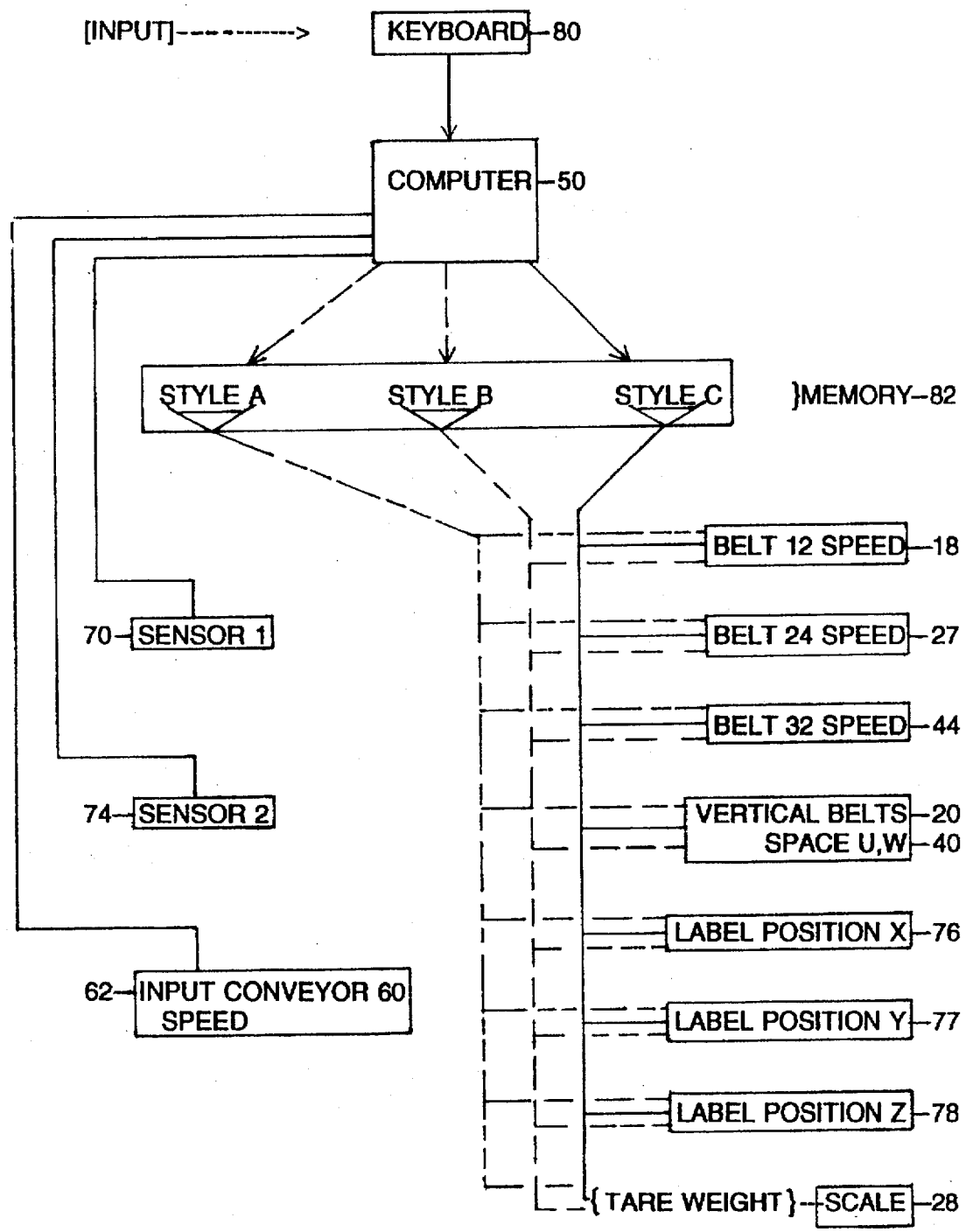
FIG. 6 is a schematic drawing of the computer control system utilized for controlling various functions of the system of the invention.

Weighing and labeling apparatus 10 operates in the functional center of the conveyorized system of the invention, as illustrated in plan view in FIG. 4. The products flow in the direction of arrows F, with representative packages P1 and P2 initially placed on input conveyor 60, driven by variable speed drive motor 62. The illustrative packages P1, P2, etc. continue through weighing and labeling apparatus 10 as described above, to exit on discharge conveyor 66, driven by variable speed drive motor 68. A pair of package sensors 70, 74 are mounted toward the exit end of discharge conveyor 66 and are interconnected with computer 50 as in FIG. 6. In the preferred embodiment, sensor 70 comprising photosensitive cell 70 is positioned across conveyor 66 from light source 72 and near the exit end of discharge conveyor 66. Sensor 74 comprising, second photosensitive cell 74 is mounted across from light source 76, a selected distance upstream from photocell/light source 70, 72. After exiting discharge conveyor 66, packages P are received at a packaging station and placed into cartons. The speed of drive motor 62 at least is preferably controlled by computer 50 as indicated in FIG. 6 though, if desired, the speed of both drive motors 62 and 68 may be controlled by computer 50 in relation to the product identification code. Depending on the desired speed of production and other factors, input conveyor 60 and discharge conveyor 66 may each be driven by a fixed speed motor or be of a non-driven roller type.

All of the described remotely controllable drive motors, servo motors, photosensitive cells and weighing device 28 are in signal communication with computer 50, a general purpose, programmable computer. The control signals generated by computer 50 and transmitted to the respective drive motors, servo motors or weighing device 28 are dependent on certain information input to computer 50, as schematically portrayed in FIG. 6.

FIG. 6 illustrates the signal communication of data to and from computer 50 as it interacts with various operational components of the conveyorized weighing and labeling system of the invention. As discussed above, packaged products of different styles may vary in dimensions and tare weight. Computer memory 82 contains a library of data organized according to pertinent package types or styles, illustrated in FIG. 6 as "Style A", "Style B", "Style C", for example. The necessary operational parameters for each style package are recorded in computer memory 82 in relation to each product style code. As a product identification style code is entered in computer 50 by an operator by means of keyboard 80, the logic circuit of computer 50 locates the related package file in its memory 82. Computer 50 then generates and transmits appropriate signals for the particular package style via computer output means to: the input conveyor variable speed drive motor 62; each weighing and labeling apparatus variable speed drive motor 18, 27, 44; each vertical control belt position adjusting servo motor 20, 40; each servo motor 76, 77, 78 connected to the respective X, Y and Z axial positioners of label device 30 and when desired to variable speed drive 68 of discharge conveyor 66 whereby to implement the needed adjustment of belt speed or component position for the package to be run. In this way, individual conveyor sections can be set to run at similar or dissimilar speeds. Computer 50 simultaneously signals scale 28 with an established tare weight for the package to be run. A similar process occurs in relation to Style B or Style C, etc. selections. The multiple adjustments of operating speeds, control belt spacing, labeling device position and tare weight are accomplished virtually instantaneously, permitting production to proceed on a new package style with little interruption. The invention recognizes that product style code information may be transmitted to the computer by means of a bar code reader or other appropriate means.

Figure 5:
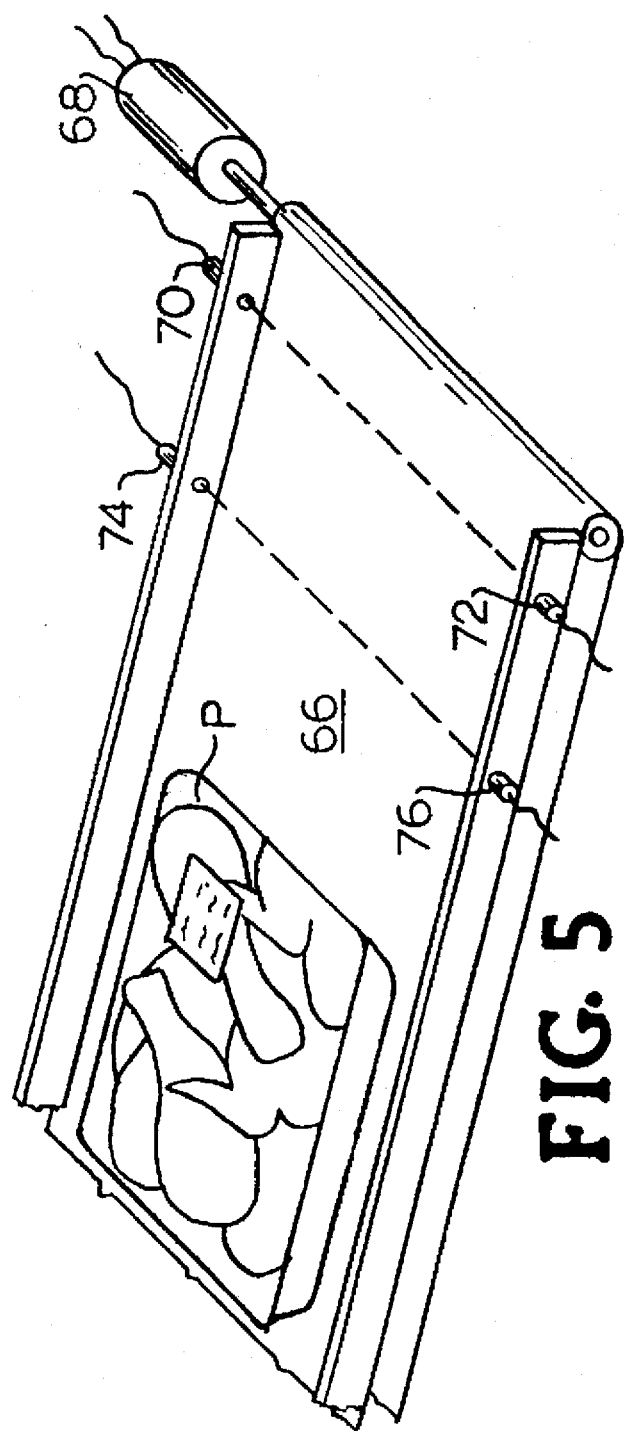
FIG. 5 is an enlarged perspective view of a portion of the discharge conveyor of the invention system and illustrating photocell sensors positioned adjacent the exit end thereof.

Computer 50 is also connected to sensors 70 and 74 to analyze signals indicative of line flow blockage. Sensor 70, in the preferred embodiment being a photosensitive cell, sends a continuous signal to computer 50 except when a package blocks the light beam sent from light source 72 (see FIG. 5). When the light beam is blocked by a package, possibly indicating a line flow blockage, computer 50 begins a preset timer, e.g. for 1.0 second. If the signal to computer 50 is reestablished before the timer has completed its cycle, the timer resets to zero and operations continue as normal. If the timer completes its cycle, computer 50 sends a signal to variable speed motor 62 to cause input conveyor 60 to slow to approximately half its normal speed. When the signal between light source 72 and photosensitive cell 70 is reestablished, input conveyor 60 continues to operate at the slowed speed until a preset number of packages, e.g. five, have passed the sensor position without the objectional delay. After the present number of packages have passed, the full operating speed of input conveyor 60 is resumed.

A similar photosensitive cell 74 and light source 76 are positioned farther upstream from photosensitive cell 70 and light source 72 by a distance somewhat in excess of the length of the longest package to be processed. When both photosensitive cells 70 and 74 are sending no signal to computer 50, a more serious line flow blockage may be indicated. The computer time cycle test is similarly actuated. If the timer completes its cycle before the photocell signals resume, a secondary signal is transmitted from computer 50 to variable speed drive motor 62 to completely stop input conveyor 60. This condition is maintained until the package flow path is cleared. This feedback control routine automatically prevents a back-up of blocked packages and possible damage to either product or machinery.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. An apparatus for weighing, labeling and transporting a series of products occurring in product groups in a high-speed processing environment, said apparatus comprising:

(a) a first conveyor having an entry end, an exit end, a first horizontal conveyor belt and a first pair of vertical control belts mounted in a pair of parallel planes which reside perpendicular to said first horizontal conveyor belt and are operative in a direction parallel to the direction of operation of said first horizontal conveyor belt at a synchronous speed therewith, said first pair of vertical control belts being separated by a space such that a product in said sequence of products being conveyed on said first horizontal conveyor is gripped securely therebetween and operative to align and stabilize said product for being weighed while being moved on a second conveyor;

(b) a first variable speed drive for driving said first conveyor including said first horizontal conveyor belt and said first pair of vertical control belts at a first selected speed;

(c) first remotely controllable belt positioning means for spacing said first pair of vertical control belts according to the width of said product;

(d) a second conveyor having an entry end at which said aligned and stabilized product is received from said exit end of said first conveyor, said second conveyor engaging a bottom product surface thereof so as to maintain said product aligned and stabilized while travelling on said second conveyor and to discharge said product at an exit end of said second conveyor;

(e) a second variable speed drive for driving said second conveyor at a second selected speed;

(f) said second conveyor being mounted on a device capable of weighing a product carried thereby to produce individual product weight information and transmit said product weight information as a signal to a signal processing device;

(g) a third conveyor having an entry end at which the aligned, stabilized and weighed product is received from the exit end of the second conveyor, said third conveyor including a second horizontal conveyor belt aligned with said second conveyor to support and transport said products for labeling and including a second pair of vertical control belts mounted in a pair of parallel planes which reside perpendicular to said second horizontal conveyor belt and are operative in a direction parallel to the direction of said second horizontal conveyor at a synchronous speed therewith, said second pair of vertical control belts being separated by a space such that said product is gripped securely therebetween;

(h) a third variable speed drive for driving said third conveyor including said second horizontal conveyor and second pair of vertical control belts at a third selected speed;

(i) second remotely controllable belt positioning means for spacing said second pair of vertical belts according to the width of said product;

(j) labeling means mounted adjacent said third conveyor and connected to said signal processing device, said labeling means capable of imprinting and transferring a label onto each product in sequence in response to said signal while each said product is stabilized and is in continuous motion on said second horizontal conveyor belt;

(k) second remotely controllable X, Y and Z axial positioning means for positioning said labeling means according to the style of said product to be labelled;

(l) a fourth conveyor having an inlet end arranged to receive products discharged from said third conveyor;

(m) a fourth variable speed drive for driving said fourth conveyor at a fourth selected speed;

(n) an input conveyor arranged to convey incoming products to said first conveyor entry end;

(o) a fifth variable speed drive for driving said input conveyor at a fifth selected speed;

(p) control means connected to said first variable speed drive, said first remotely controllable belt positioning means, said second variable speed drive, said third variable speed drive, said second remotely controllable X, Y and Z axially positioning means, said fourth variable speed drive and said fifth variable speed drive and including preprogrammed instructions related to the respective style of a product in each respective group of products and in response to an instruction corresponding to a particular product, transmittion a signal to each of said drives and remotely controllable positioning means, whereby to cause said first and second remotely controllable positioning means to position said first and second pairs of vertical belts according to the width of said product, said second remotely controllable positioning means to position said labeling means according to the style of said product and said first, second, third, fourth and fifth variable speed drives according to the desired speed of driving said first, second, third, fourth and fifth variable speed drives; and (q) a first sensor located adjacent an exit end of said fourth conveyor and capable of sensing the presence of a product and in the absence of sensing a product transmitting a continuous signal to said control means enabling said control means to monitor the time sequence of said series of products through said apparatus and when said time sequence is not correct generate and transmit a corresponding signal to said fifth variable speed drive to adjust the operative speed of said input conveyor accordingly.

2. An apparatus as claimed in claim 1 including a second sensor located upstream of said exit end of said fourth conveyor by a distance in excess of the length of the longest said product conveyed thereon and in conjunction with said first sensor capable of sensing the simultantous presence of products at both said first and second sensors and in such event to generate and transmit a signal to said control means operative to deenergize said fifth variable speed drive.

* * * * *